Nov. 26, 1968   P. L. MARKOVIC   3,412,479
ROLL STRUCTURE FOR DRYING OF CELLOPHANE
Filed March 25, 1966

INVENTOR
PATRICK LEWIS MARKOVIC

BY Claude L. Beaudoin

ATTORNEY

United States Patent Office 3,412,479
Patented Nov. 26, 1968

3,412,479
ROLL STRUCTURE FOR DRYING
OF CELLOPHANE
Patrick Lewis Markovic, Clinton, Iowa, assignor to E. I. du Pont de Nemours and Company, Wilmington, Del., a corporation of Delaware
Filed Mar. 25, 1966, Ser. No. 537,288
1 Claim. (Cl. 34—240)

ABSTRACT OF THE DISCLOSURE

A roll structure adapted for use in drying cellophane film structures is provided; said roll structure generally comprises a cylindrical body of aluminum having an initial surface roughness of less than 80 microinches (RMS), a Brinell Hardness of between 25 and 75, and a final surface roughness between 300 and 650 microinches (RMS).

---

The present invention relates to the manufacture of cellophane film structures and, more particularly, is directed to an improved roll device for drying film structures of regenerated cellulose and to a method of manufacture therefor.

Regenerated cellulose films are generally prepared by extruding an alkaline solution of cellulose xanthate (viscose) through a long, thin casting die or hopper into a sulfuric acid-sodium sulfate coagulation-regeneration bath, which first coagulates the cellulose xanthate as a coherent sheet of film, then decomposes the xanthate to produce a highly swollen, moisture laden gel film of regenerated cellulose. The freshly formed gel film is subsequently passed through a series of liquid treating baths to wash, desulfurize, bleach and plasticize the film to remove impurities, improve its brightness, flexibility and strength. The purified and plasticized film is then dried while passing over a series of heated drums and collected into roll form for storage or for further process treatment such as, for example, the application of a moisture-proof coating thereto.

The drying step or operation in the above-described process is performed by conducting the gel regenerated cellulosic film over and in intimate contact with one or more heated cylindrical rolls in a suitable enclosure having forced hot air circulating therein. It has been found heretofore in drying regenerated cellulose films that a tentering action on the cellulosic film is desirable in order to prevent transverse shrinkage thereof, and such tentering may be realized by providing a non-smooth finish on the surface of the heated cylindrical drying rolls. For example, U.S. Patent 2,000,079 discloses passing film structures over rolls having a special surface finish such as an adhesive applied over the entire roll surface or only to restricted portions of the surface thereof which functions to minimize the lateral contraction or slipping of the film structure as it advances thereover. A major problem encountered in the use of such roll structures having a sufficient degree of roughness to prevent or limit excessive transverse shrinkage of cellulosic webs passing thereover is that the roughness of the surface finish of the roll structure degrades the cellulosic film surface in contact therewith as by abrading and puncturing the cellulosic film. The foregoing problem is further aggravated in the manufacture of thin cellophane films wherein the problem of "dimpling" is encountered. Dimpling is the term employed to refer to that defect in the appearance of coated regenerated cellulose films consisting in an overall pattern of small, fine grained distortions which are intensified in the cellulosic film as the relative humidity of its environment increases. The condition has also been referred to as pocking or wrinkling. The phenomenon is not to be confused with the defect termed puckering or cockling, which is a condition consisting of individual distorted areas having flat even centers and wrinkles extending radially outwardly therefrom. Although puckering also is observed when the relative humidity of the cellulosic film environment increases, it is a localized distortion that occurs only in portions of the film structure having a damaged or pinholed coating. Dimpling is not associated with damaged coating, and indeed occurs even when the coating is perfect and intact. Accordingly, it is the principal object of the present invention to provide an improved cylindrical roll useful in the manufacture of cellophane film structures that are free of the above-mentioned drawbacks.

According to the present invention, there is provided a roll structure for passing gel regenerated cellulose films thereover characterized by a cylindrical body of aluminum of initial surface roughness of less than 80 microinches (RMS) and a Brinell Hardness of between about 25 and about 75, and a final surface roughness of between about 300 and about 650 microinches (RMS).

According to the present invention, there is further provided a method of manufacture for preparing the above described roll structure which comprises finishing the surface of a cylindrical body of aluminum of Brinell Hardness of between 25 and about 75 to a roughness of less than about 80 microinches (RMS) and thereafter finishing the surface of said roll by shotblasting with steel shot of size number between S-70 and about S-230 to a roughness of between about 300 and about 650 microinches (RMS).

The nature and advantages of the invention will be more clearly understood by the following description thereof. Whenever used herein, the expression (RMS) means root-mean-square and refers to the measurement in microinches of the surface roughness of the cylindrical roll structures described herein on the basis of the average deviation from the mean value of the surface finish thereof.

Figure 1:
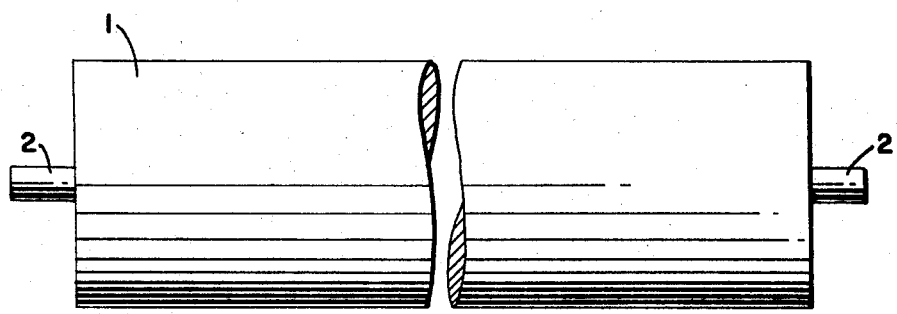
FIG. 1 shows the roll structure of the invention.

The drawing shows a roll 1 having a spindle 2 at each end.

Figure 2:
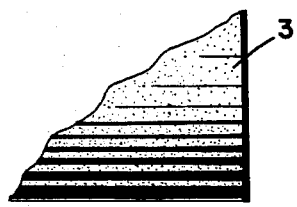
FIG. 2 shows an enlarged view of a fragment of the roll of FIG. 1.

FIG. 2 of the drawing shows, at 3, the roughened surface of roll 1.

The roll structure of the present invention is fabricated of aluminum, preferably aluminum alloyed with magnesium, having a hardness on the Brinell scale of between about 25 and about 75. It is essential and necessary, for reasons more fully set forth hereinafter, that the initial surface roughness of the aluminum roll be less than about 80 microinches (RMS). It also is essential and necessary that the final surface roughness of the roll structure be between about 300 and about 650 microinches (RMS).

The foregoing essential features of the roll structure of the present invention are indeed surprising and totally unexpected, especially that regarding the initial surface roughness of the aluminum roll. To illustrate, it is necessary that the initial roughness of the aluminum roll be less than about 80 microinches (RMS), since otherwise excessive dimpling will occur of the cellulosic film passing over the finished roll structure of surface roughness between 300 and 650 microinches (RMS). The necessity of an aluminum roll having an initial surface roughness of less than 80 microinches (RMS) is shown in Control A of Example 1 herebelow. Also, the final surface roughness of the roll structure must exceed about 300 microinches (RMS) in order to impart a sufficient tentering action but must not exceed about 650 microinches (RMS) in order not to adversely affect, as by abrading or puncturing, the surface of the cellulosic film passing thereover.

The method for preparing the above-described roll structure comprises finishing the surface of a cylindrical body of aluminum of Brinell Hardness of between about 25 and about 75 to a roughness of less than about 80 microinches (RMS), and thereafter shotblasting said roll surface with steel shot of size number between S–70 and S–230 to a surface roughness of between 300 and 650 microinches (RMS). The aluminum roll may be fabricated, for example, from a 3S1/2H seamless tubing of aluminum alloyed with 1% magnesium and of Brinell Hardness of about 40. The surface of the aluminum roll is finished preferably by machining to an initial roughness of about 50±10 microinches (RMS). The surface finish measurements may be conveniently made with any suitable device for that purpose, such as a Brush Instrument Company "Surfindicator" Model BL–110 instrument. The roll surface is thereafter shotblasted preferably with number S–170 steel shot utilizing any apparatus or device suitable for that purpose. The steel shot may range in size from size number S–70 to size number S–230, based upon standard S.A.E. Specification J444 procurable from the Pangborn Corporation, 840 S. Oak Park, Oak Park, Ill. The shotblasting may be conveniently performed utilizing commercially available shotblasting apparatus such as Vacu-Blaster Model No. C10–D6 generator-reclaimer in combination with dust collector Model No. D3 obtainable from the Vacu-Blast Company, Incorporated, 350 Peninsular Ave., San Mateo, Calif.

The principle and practice of the present invention will now be illustrated by the following examples which are provided to show the practice and use thereof, but it is not intended that the invention be limited thereto since modifications in technique and operation will be apparent to anyone skilled in the art.

The test samples of cellulosic film structures prepared in apparatus utilizing the roll structure of the present invention were evaluated in accordance with the following testing procedure:

Dimpling is evaluated by placing a sample sheet of coated regenerated cellulose over and in intimate contact with the flat surface of a wet sponge resting on a rigid base of suitable material such as sheet glass or metal. The edges of the sample sheet of regenerated cellulose are firmly secured to the edges of the rigid base with suitable clip members. After exposure of twenty minutes the sample sheet is rated visually as follows:

Grade 1: no dimpling
Grade 2: little dimpling
Grade 3: moderate dimpling
Grade 4: heavy dimpling
Grade 5: severe dimpling A second sample of the same sheet of regenerated cellulose also is tested by placing the reverse side of the sample sheet in this instance in contact with the wet sponge. Cellulosic film structures having a dimple rating of either Grade 1 or Grade 2 are acceptable for packaging, whereas film structures having a dimple rating of Grades 3, 4 and 5 are not acceptable.

*Example 1*

A continuous sheet of gel regenerated cellulose film containing about 300% moisture and an appropriate softening agent was dried to a moisture content of 10% by passing film over and in contact with heated aluminum rolls in a dryer, said rolls first having been machined to a degree of roughness of 60 microinches (RMS) and then shotblasted with S–170 steel shot. The surface roughness of the final finished roll was 450 microinches (RMS). The resulting dried film was coated on one side with a nitrocellulose coating and was then subjected to the dimpling test. The dried film exhibited a dimple rating of Grade 1.

Following the procedure described above, a similar film as above and designated Control A was dried utilizing heated aluminum rolls having a surface roughness before having been shotblasted of 200 microinches (RMS), surface roughness after having been shotblasted of 400 microinches (RMS). The dried control film structures exhibited a dimple rating of Grade 4.

In the same manner as immediately above, a similar film designated Control B was dried utilizing heated aluminum rolls having a surface roughness before having been shotblasted of 60 microinches (RMS) and a final surface roughness of 950 microinches (RMS) after having been shotblasted with No. S–660 steel shot. The dried control film structure exhibited a dimple rating of Grade 5.

Following the above procedure, a continuous sheet of gel regenerated cellulose film containing about 300% moisture and softening agent was dried to a moisture content of about 10% by passing the film over and in contact with heated aluminum rolls in a dryer, said rolls having an initial surface roughness of about 80 microinches (RMS) and not further treated by shotblasting. The resulting dried film was coated on both sides with a vinylidene chloride copolymer and subjected to the dimpling test. The dried film exhibited a dimple rating of Grade 1, but showed a width loss during drying of 14%.

*Example 2*

A continuous sheet of gel regenerated cellulose film containing about 300% moisture and an appropriate softening agent was dried from a moisture content of about 50% to a moisture content of about 8% by passing the film over and in contact with heated aluminum rolls in a dryer, said rolls characterized by an initial surface roughness of 60 microinches (RMS) and a final surface roughness after shotblasting with S–170 steel shot of about 400 microinches (RMS). The resulting dried film was coated on both surfaces with nitrocellulose and subjected to the dimpling test. The dried film exhibited a dimple rating of Grade 2. Width loss during drying was 5%.

The above procedure was repeated utilizing a coating of a vinylidene chloride copolymer (derived from 91.5 parts of vinylidene chloride, 6 parts of acrylonitrile, 2 parts of methylmethacrylate and 0.5 part of itaconic acid) on both surfaces of the dried cellulose film. The dried film exhibited a dimple rating of Grade 2.

Following the procedure described above, a similar film coated with nitrocellulose and designated Control A was dried utilizing heated aluminum rolls having a surface roughness, initially, of 200 microinches (RMS) and, after shotblasting, of 400 microinches (RMS). The dried control film structure exhibited a dimple rating of Grade 4.

*Example 3*

Comparative tests were performed on parallel cellophane casting machines wherein the dryer in one machine employed heated cylindrical aluminum rolls initially finished to a surface roughness of 50 microinches (RMS) and shotblasted with S–170 steel shot to a final surface roughness of 450 microinches (RMS). The second casting machine employed a dryer having heated cylindrical aluminum rolls initially finished to a surface roughness of 50 microinches (RMS) and a final surface roughness of 450 microinches (RMS) achieved by applying a coating of crinkle varnish uniformly over the entire surface thereof. Both machines produced cellophane film of essentially the same quality and showed excellent control and maintenance of film width during drying in the early part of the test. After about 3 months the dryer equipped with the varnished rolls began to show increasing width loss of the film during drying, and after about 4 months the rolls had to be re-varnished because of excessive width loss during production. In direct contrast, the dryer equipped with the shotblasted roll surface showed no diminution of film width control after a period of 1 year.

What is claimed is:
1. An article of manufacture comprising a roll structure adapted for contacting and advancing thereover gel regenerated cellulose film structures characterized by a cylindrical body of aluminum of initial surface roughness of less than about 80 microinches (RMS) and a Brinell Hardness of between about 25 and about 75, and a final surface roughness of between about 300 and about 650 microinches (RMS).

References Cited

UNITED STATES PATENTS

| 1,932,168 | 10/1933 | Adams | 29—1 |
| 2,151,048 | 3/1939 | Rowe | 34—1 |
| 2,725,640 | 12/1955 | Voigtman | 29—121 |
| 2,765,682 | 10/1956 | Wiley | 29—121 |
| 3,018,540 | 1/1962 | Cavannes | 29—148.4 |
| 3,177,558 | 4/1965 | Gromholz et al. | 29—1 |

FREDERICK L. MATTESON, JR., *Primary Examin.*

H. B. RAMEY, *Assistant Examiner.*